US010606685B2

(12) United States Patent
Charters et al.

(10) Patent No.: US 10,606,685 B2
(45) Date of Patent: *Mar. 31, 2020

(54) DIAGNOSTIC STACKFRAME BUFFER

(71) Applicant: International Business Machines Corporation, Armonk, NY (US)

(72) Inventors: Graham C Charters, Hampshire (GB); Lewis Evans, Reading (GB); Timothy Mitchell, Chandlers Ford (GB); Adam Pilkington, Eastleigh (GB)

(73) Assignee: International Business Machines Corporation, Armonk, NY (US)

( * ) Notice: Subject to any disclaimer, the term of this patent is extended or adjusted under 35 U.S.C. 154(b) by 63 days.

This patent is subject to a terminal disclaimer.

(21) Appl. No.: 15/933,666

(22) Filed: Mar. 23, 2018

(65) Prior Publication Data

US 2018/0210776 A1 Jul. 26, 2018

Related U.S. Application Data

(63) Continuation of application No. 15/157,103, filed on May 17, 2016, now Pat. No. 9,971,641.

(51) Int. Cl.
*G06F 11/00* (2006.01)
*G06F 11/07* (2006.01)

(52) U.S. Cl.
CPC ........ *G06F 11/079* (2013.01); *G06F 11/0712* (2013.01); *G06F 11/0751* (2013.01); *G06F 11/0754* (2013.01); *G06F 11/0778* (2013.01); *G06F 11/0787* (2013.01); *G06F 2201/81* (2013.01)

(58) Field of Classification Search
CPC ..... G06F 11/25; G06F 11/267; G06F 11/3409

USPC .................................................... 714/37, 39
See application file for complete search history.

(56) References Cited

U.S. PATENT DOCUMENTS

| 7,506,314 | B2 * | 3/2009 | Kollmann ........... G06F 11/3476 714/45 |
| 8,108,839 | B2 | 1/2012 | Clark |
| 8,438,424 | B2 | 5/2013 | Elliott et al. |
| 8,607,098 | B2 | 12/2013 | Devegowda et al. |
| 8,949,671 | B2 | 2/2015 | Mukherjee |
| 9,009,539 | B1 | 4/2015 | Kompotis et al. |
| 2011/0191637 | A1 * | 8/2011 | Wight .................... G06F 11/00 714/43 |

(Continued)

OTHER PUBLICATIONS

Anonymous: "Storing Time Stamps on Stack for in Memory Tracing", IPCOM000228716D, Jul. 1, 2013.

(Continued)

*Primary Examiner* — Sarai E Butler
(74) *Attorney, Agent, or Firm* — Patterson + Sheridan, LLP

(57) ABSTRACT

Diagnostic information for a program execution is provided, where the program is executable in a machine having a program stack for individual program elements. At least one program element is saved from the program stack into an event buffer as the at least one program element is executed. A historical event buffer associated with at least one runtime error is loaded, and a similarity between the event buffer and the historical event buffer is determined. It is requested that at least one type of diagnostic information be provided with the execution of the program in the event buffer when the determined similarity exceeds a threshold similarity.

20 Claims, 4 Drawing Sheets

(56) References Cited

U.S. PATENT DOCUMENTS

| | | | |
|---|---|---|---|
| 2014/0068330 A1* | 3/2014 | Hecox | G06F 11/0706 714/26 |
| 2015/0220421 A1 | 8/2015 | Romer et al. | |
| 2015/0363277 A1* | 12/2015 | Cher | G06F 11/1438 714/19 |
| 2017/0337096 A1 | 11/2017 | Charters et al. | |

OTHER PUBLICATIONS

Anonymous: "First Failure DataCapture (FFDC) Technique", IPCOM000222155D, Sep. 20, 2012.
IBM, "Appendix P-List of IBM Patents or Patent Applications Treated as Related," dated Mar. 22, 2018, 2 pages.

\* cited by examiner

DIAGNOSTIC STACKFRAME BUFFER

This application is a continuation of co-pending U.S. patent application Ser. No. 15/157,103 filed May 17, 2016. The aforementioned related patent application is herein incorporated by reference in its entirety.

BACKGROUND

The present invention relates to a method and apparatus for a diagnostic event buffer.

When a computer system encounters an error then it is possible to provide a snapshot of a computer system program stack for diagnostic purposes. The snapshot of the program stack at the point of error is just a small portion of the context of the error since the stack frame can grow and shrink over time and historical path information beyond that snapshot is not available. What is not provided is a comprehensive code path taken leading up to the error occurrence. In order to be able to debug the error, a user configures a conventional trace for the duration of a diagnostic test that may need to run for hours and days before the error reoccurs. A conventional trace can also change execution, and this can affect how the code behaves, sometimes preventing the error from happening.

SUMMARY

According to one aspect of the present disclosure, a system for providing diagnostic data for execution of a program is provided. The program is executable in a machine having a program stack for individual program elements of the program. The system comprises a historical event buffer comprising historical execution data associated with at least one runtime error, and an event buffer for saving at least one program element from the program stack as the at least one program element is executed. The system also comprises a buffer similarity engine for determining a similarity of the event buffer with the historical event buffer, and a diagnostic engine for requesting diagnostic information with the execution of the program in the event buffer when the determined similarity exceeds a threshold.

According to a second aspect of the present disclosure, a method for providing diagnostic information for a program execution is provided. The program is executable in a machine having a program stack for individual program elements. The method comprises saving at least one program element from the program stack into an event buffer as the at least one program element is executed, and loading a historical event buffer associated with at least one runtime error. The method further comprises determining a similarity between the event buffer and the historical event buffer, and requesting at least one type of diagnostic information be provided with the execution of the program in the event buffer when the determined similarity exceeds a threshold similarity.

According to a third aspect of the present disclosure, a computer program product for providing diagnostic information for application execution is provided. The application is executable in a machine having a program stack for individual application elements. The computer program product comprises a computer readable storage medium comprising program instructions embodied therewith, the program instructions executable by a processor to perform an operation. The operation comprises saving at least one program element from the program stack into an event buffer as the at least one program element is executed, and loading a historical event buffer associated with at least one runtime error. The operation further comprises determining a similarity between the event buffer and the historical event buffer, and requesting at least one type of diagnostic information be provided with the execution of the program in the event buffer when the determined similarity exceeds a threshold similarity.

BRIEF DESCRIPTION OF THE DRAWINGS

Embodiments of the present invention will now be described, by way of example only, with reference to the following drawings in which.

DETAILED DESCRIPTION

Figure 1:
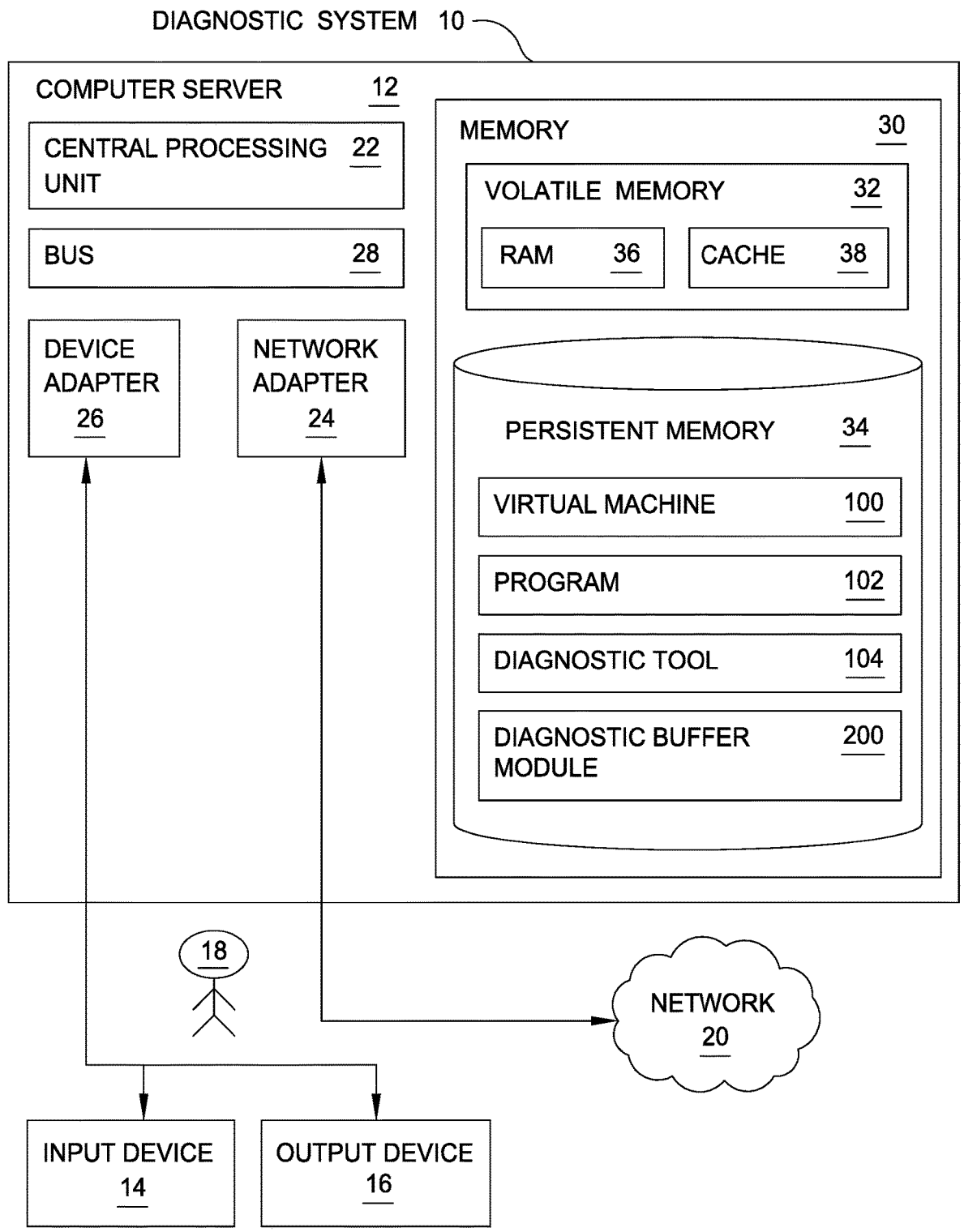
FIG. 1 is a deployment diagram, according to one embodiment.

Referring to FIG. 1, the deployment of one embodiment in diagnostic system 10 is described. Diagnostic system 10 is operational with numerous other general purpose or special purpose computing system environments or configurations. Examples of well-known computing processing systems, environments, and/or configurations that may be suitable for use with diagnostic system 10 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed computing environments that include any of the above systems or devices. A distributed computer environment may include a cloud computing environment, e.g., where a diagnostic system is a third party service performed by one or more of a plurality computer processing systems. A distributed computer environment may also include an Internet of Things computing environment, e.g., where computer processing systems are distributed as a network of objects that can interact with a computing service.

Diagnostic system 10 may be described in the general context of computer system executable instructions, such as program modules, being executed by a computer processor. Generally, program modules may include routines, programs, objects, components, logic, and data structures that perform particular tasks or implement particular abstract data types. Diagnostic system 10 may be embodied in distributed cloud computing environments where tasks are performed by remote processing devices that are linked through a communications network. In a distributed cloud computing environment, program modules may be located in both local and remote computer system storage media including memory storage devices.

Diagnostic system 10 comprises: general purpose computer server 12 and one or more input devices 14 and output devices 16 directly attached to the computer server 12. Diagnostic system 10 is connected to a network 20. Diagnostic system 10 communicates with a user 18 using input devices 14 and output devices 16. Input devices 14 include one or more of a keyboard, a scanner, and a mouse, trackball, or another pointing device. Output devices 16 include one or more of a display or a printer. Diagnostic system 10 communicates with network devices (not shown) over network 20. Network 20 can be a local area network (LAN), a wide area network (WAN), or the Internet.

Computer server 12 comprises a central processing unit (CPU) 22, network adapter 24, device adapter 26, bus 28, and memory 30.

CPU 22 loads machine instructions from memory 30 and performs machine operations in response to the instructions. Such machine operations include: incrementing or decrementing a value in a register; transferring a value from memory 30 to a register or vice versa; branching to a different location in memory if a condition is true or false (also known as a conditional branch instruction); and adding or subtracting the values in two different registers and loading the result in another register. A typical CPU can perform many different machine operations. A set of machine instructions is called a machine code program, the machine instructions are written in a machine code language which is referred to a low level language. A computer program written in a high level language needs to be compiled to a machine code program before it can be run. Alternatively a machine code program such as a virtual machine or an interpreter can interpret a high level language in terms of machine operations.

Network adapter 24 is for enabling communication between the computer server 12 and network devices.

Device adapter 26 is for enabling communication between computer server 12 and input devices 14 and output devices 16.

Bus 28 couples the main system components together including memory 30 to CPU 22. Bus 28 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Memory 30 includes computer system readable media in the form of volatile memory 32 and non-volatile or persistent memory 34. Examples of volatile memory 32 are random access memory (RAM) 36 and cache memory 38. Examples of persistent memory 34 are read only memory (ROM) and erasable programmable read only memory (EPROM). Generally, volatile memory is used because it is faster and generally non-volatile memory is used because it will hold the data for longer. Diagnostic system 10 may further include other removable and/or non-removable, volatile and/or non-volatile computer system storage media. By way of example, persistent memory 34 can be provided for reading from and writing to a non-removable, non-volatile magnetic media (not shown and typically a magnetic hard disk or solid-state drive). Although not shown, further storage media may be provided including an external port for removable, non-volatile solid-state memory, and an optical disk drive for reading from or writing to a removable, non-volatile optical disk such as a compact disk (CD), digital video disk (DVD) or Blu-ray. In such instances, each can be connected to bus 28 by one or more data media interfaces. As will be further depicted and described below, memory 30 includes a program product having modules that are configured to carry out the functions of embodiments of the invention.

The modules comprise virtual machine 100, diagnostic tool 104, and diagnostic buffer module 200. A further module, program 102, is the program that is the target for debugging and analysis. In the preferred embodiment the modules are loaded from the persistent memory 34, where it is stored, into volatile memory 32 for operation. In another embodiment, ROM in memory 30 stores the modules for enabling the computer server 12 to function as a special purpose computer specific to the module 200. Further program modules that support the preferred embodiment but are not shown include firmware, boot strap program, operating system, and support applications. Each of the operating system; support applications; other program modules; and program data; or some combination thereof; may include an implementation of a networking environment.

Diagnostic system 10 communicates with at least one network 20 (such as a local area network (LAN), a general wide area network (WAN), and/or a public network like the Internet) via network adapter 24. Network adapter 24 communicates with the other components of computer server 12 via bus 28. It should be understood that although not shown, other hardware and/or software components could be used in conjunction with diagnostic system 10. Examples, include, but are not limited to microcode, device drivers, redundant processing units, external disk drive arrays, redundant array of independent disks (RAID), tape drives, and data archival storage systems.

Virtual machine 100 includes a program stack for storing program elements from program 102 prior to execution. Although the present embodiment utilizes a program stack of a virtual machine, other embodiments envisage using a program stack of a silicon processor such as CPU 22. Hence, the term machine program stack is used to describe a generic program stack.

Program 102 can be any program or application for execution by virtual machine 100.

Diagnostic tool 104 is a set of individual diagnostic probes. Each diagnostic probe can provide a record of diagnostic events concurrently with program events from an executing program 102. One or more diagnostic probes can be switched on to provide a range of diagnostic information individually or altogether. The more diagnostic probes that are operating at the same time, then the more that all computing resources in the environment are used. For example, diagnostics can have an effect on processor usage and memory, disk space and transfer rates, and network traffic. The embodiments aim to minimize the number of diagnostic probes operating by focusing when they are most needed.

Diagnostic buffer module 200 is for performing the preferred embodiment. In one embodiment, diagnostic buffer module 200 is a separate module from virtual machine module. However, virtual machine embodiments are envisaged where the virtual machine includes the diagnostic buffer module 200 or components from the diagnostic buffer module 200.

Figure 2:
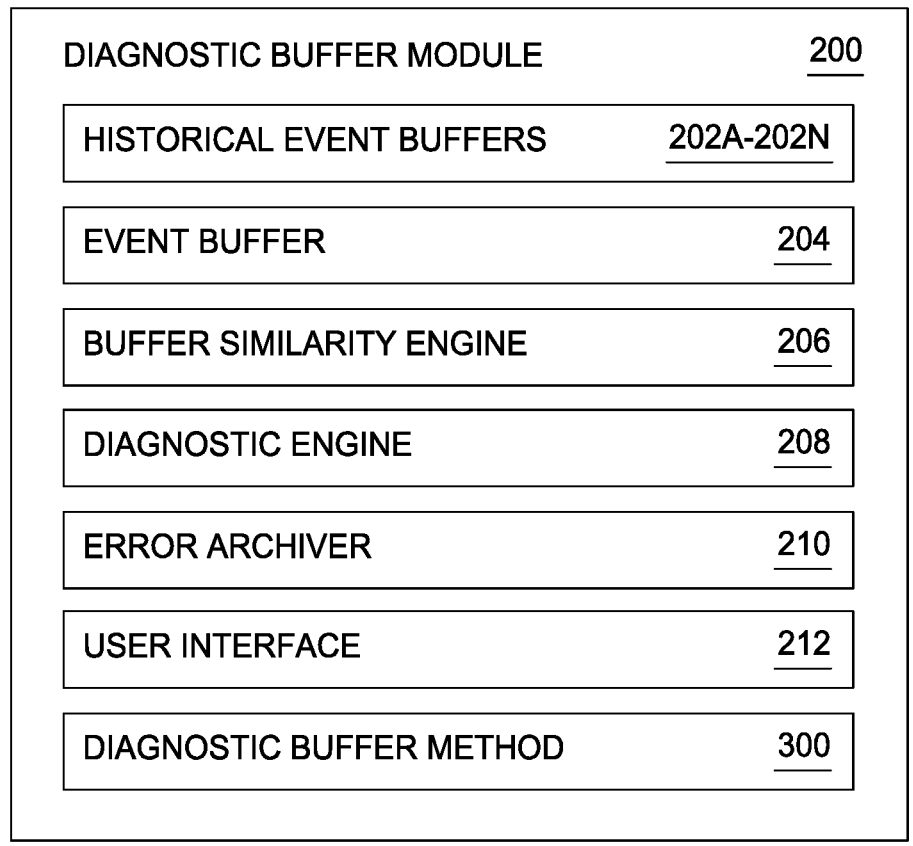
FIG. 2 is a component diagram, according to one embodiment.

Referring to FIG. 2, diagnostic buffer module 200 comprises the following components: historical event buffer 202A to 202N; event buffer 204; buffer similarity engine 206; diagnostic engine 208; error archiver 210; user interface 212; and diagnostic buffer method 300.

Historical event buffers 202A to 202N are for loading historical event buffer information associated with runtime errors. Loading of multiple historical event buffer information in a single execution allows diagnosis of multiple problems simultaneously.

Event buffer 204 is for storing the full execution data of the program stack of virtual machine 100 as it happens. Embodiments use an event buffer that stores historical execution information for the running system. The event buffer size may be fixed or variable. Recording of the event buffer is low-overhead and permanently recorded. When a failure is encountered, the event buffer is either written to disk or will be present in a core file, therefore providing additional diagnostic information.

Buffer similarity engine 206 is for determining a similarity of the event 204 with any one of the loaded historical event buffers 202A to 202N. Primarily the buffer similarity engine 206 compares program execution elements rather than diagnostic events so that a comparison is made directly between program elements and historical programs elements. In other embodiments diagnostic events could also be compared to give an overall similarity for diagnostics events and program elements.

Diagnostic engine 208 is for requesting one or more diagnostic records concurrently with executing a program in a program stack and saving the diagnostic records in event buffer 204 so that the full execution data is associated with the diagnostic records. Requests are made to diagnostic tool 104 and corresponding diagnostic probes. The diagnostic records can be saved as in the event buffer or separately from the event buffer.

Error archiver 210 is for, after an error, saving the event buffer as a historical event buffer and associating the historical event buffer with the machine error so that further diagnostics can be applied at a later date if a similar event buffer is repeated.

User interface 212 is for allowing control of buffer size, buffer numbers, and for controlling which diagnostic probes to switch on or off.

Diagnostic buffer method 300 is for controlling the components of the diagnostic module to perform the present embodiment.

The embodiments propose that, following a prior runtime error where a historical event buffer has been generated, the historical event buffer is loaded for comparison with an event buffer for a currently executing program and when the runtime detects that it is similar to a historical event buffer, it starts to turn on diagnostic information. The level of diagnostic information and cost is proportionally increased in relation to the magnitude of similarity of the event buffers. That is, light diagnostics when the probability is low of an error (low similarity), and more or full diagnostics when there is more certainty that there will be an error (high similarity). There is also the option to configure which diagnostics are to be turned on at a given probability for the event buffer match. This means the additional diagnostics generation does not adversely affect the diagnostic system execution and is also better targeted to the problems being diagnosed.

There is no need for code instrumentation for diagnostics provided by the runtime. There is no adverse effect when diagnosing problems even when the system is providing full diagnostics or when matching all the historical event buffers. It is possible to supply event buffers from other runtimes which have had a problem in order to pre-emptively enable diagnostics in runtime that has not experienced the failure. Historical event buffers are available when an error occurs and there is no need to re-run to try to recreate the problem.

The preferred embodiment is described in terms of a virtual machine, but could be applied to other managed runtimes such as the CPU 22. A virtual machine can record the currently executing stack frame and information relating to the source code, such as classes, methods, program counter, runtime events, into an event buffer.

Historical buffers are loaded back into the virtual machine in order to configure targeted diagnostics. A virtual machine matches the historical event buffer against the current event buffer and when it identifies that the execution is likely to be taking the error path, it automatically increases the diagnostics to capture additional information.

The present embodiment uses a comparison of execution events, but other embodiments allow for user-defined event buffer sizes, e.g., time or number of entries. Another embodiment allows for variable diagnostics based on the probability of being on the error path (e.g., for a probability greater than 95 out of 100, tracing is set to a maximum). Optionally, the user can specify what diagnostics to apply at different probability levels. The present embodiment allows for multiple buffers in a single execution to diagnose multiple problems simultaneously. The present embodiment allows the ability to load buffers into tools and view the historical execution path.

Figure 3:
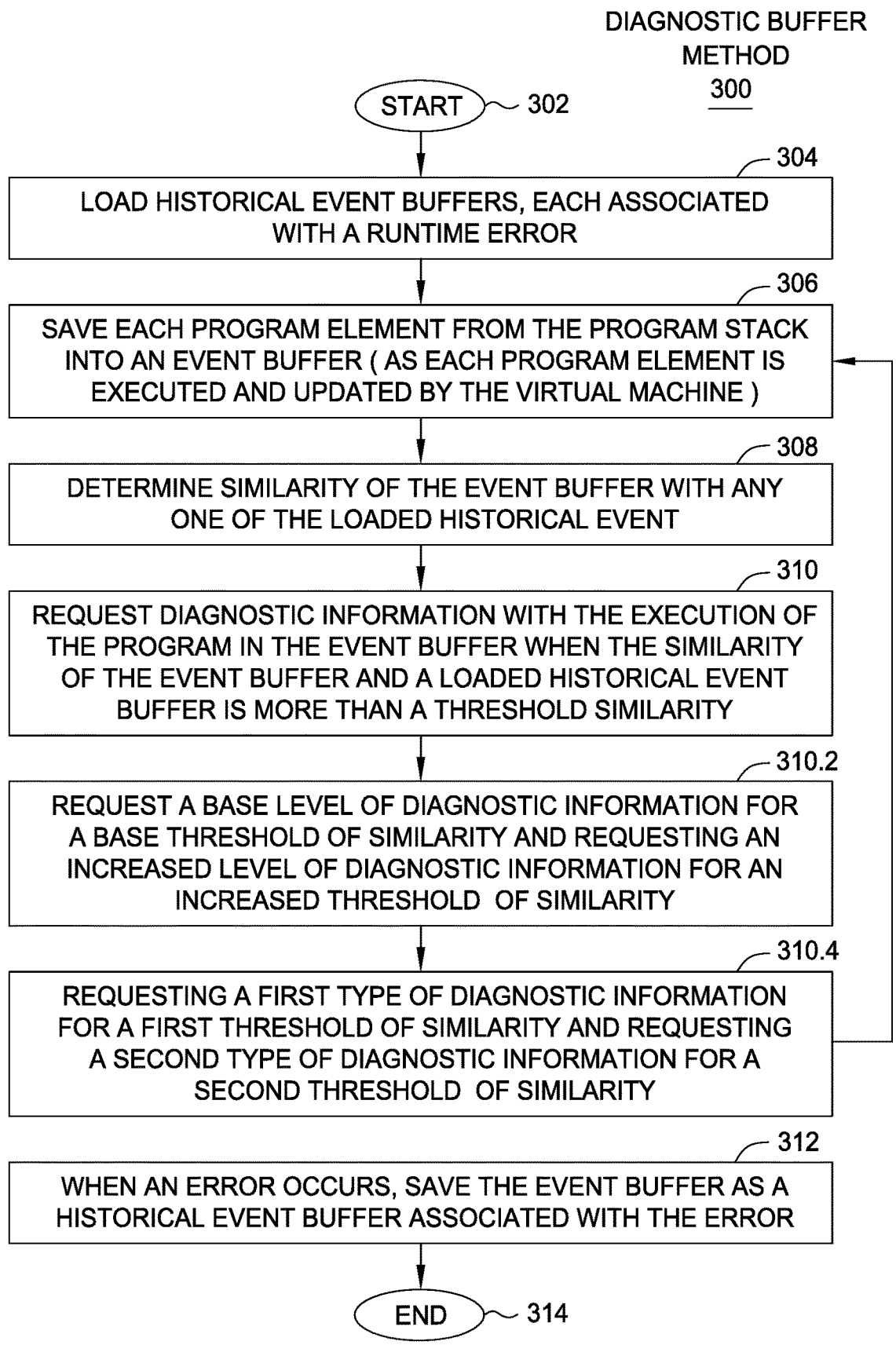
FIG. 3 is a flow diagram of a process of one embodiment.

Referring to FIG. 3, an example diagnostic buffer method 300 comprises logical process steps 302 to 314. Although there is an order to the steps of the embodiment as described, the steps do not need to be in this order unless specified. In other embodiments, steps can be in a different order.

Step 302 is the start of the method when the virtual machine is switched on so that the diagnostic buffer method can be operational for every program that the virtual machine is executing. Each program comprises individual program elements that are sequentially moved through the program stack and executed.

Step 304 is for loading a historical event buffer associated with at least one runtime error. Further historical event buffers associated with further runtime errors may be loaded. Loading of multiple historical event buffers in a single execution allows diagnosis of multiple problems simultaneously.

Step 306 is for saving each program element from the program stack into an event buffer as each program element is executed and updated with a new program element in the program stack. In the present embodiment, a saved program element is the same as an executed and updated program element, but it is envisaged that an abstracted form of saved program element may be used to reduce the amount of memory used by an event buffer and corresponding historical event buffers.

Step 308 is for determining a similarity of the event buffer with any one of the loaded historical event buffers.

Step 310 is for requesting diagnostic information with the execution of the program in the event buffer when the similarity of the event buffer and a loaded historical event buffer is more than a threshold similarity. This is the basic operation of step 310. The diagnostic information captured can include garbage collection events, method trace, class loader trace, Java cores, head dumps, and system cores or any virtual machine events. The choice of what information is captured and the point at which it is captured (e.g., based on quality of diagnostic buffer match) would be configurable, with useful defaults (e.g., most expensive diagnostics captured only when the buffer match is high).

When an execution is likely to be going down a path then the event buffer has followed a historical event buffer to a point. The event buffer may match the beginning of the historical event buffer but the execution may go down a different code path and not reproduce the same failure as in a diagnostic buffer. When the embodiments recognise that an event buffer is getting closer to an error, it can start increasing the level of diagnostic traces performed with the execution. There may be machine events happening (like garbage collection) that cause the intermittent failure. The event buffer can also store virtual machine events like garbage collection to better match the exact circumstances of the failure.

Step 310 further comprises logical process steps 310.2 and 310.4 that the basic operation of step 310.

Step 310.2 is for requesting a base level of diagnostic information for a base threshold of similarity (step 310 basic operation) and requesting an increased level of diagnostic information for an increased threshold of similarity.

Step 310.4 is for requesting a first type of diagnostic information for a first threshold similarity (step 310 basic operation) and requesting a second type of diagnostic information for a second threshold of similarity. Further types of diagnostic information can be requested for a further increased threshold of similarity. This allows for targeting of diagnostic information to problems that need diagnostics and reduces the effect of the runtime system for diagnostic information.

After step 310 the process repeats at step 306 for each program element. If an error occurs then the process interrupts and jumps to step 312. Groups of program elements can be used to reduce the granularity and processing workload.

Step 312 is for saving an event buffer, after a runtime error, as a historical event buffer and associating the historical event buffer with the runtime error. When there is an error then the historical event buffer can be saved to storage or will already be present in a core file, thereby providing additional diagnostic information. If there is no associated error, then the event buffer is discarded. Thereby, each historical event buffer comprises an execution event from before a point or range associated with the error. The size of the event buffer is defined in the context of the program execution. The size of the event buffer can also be defined in terms of time, or number of entries, and/or be user-defined.

Step 314 is the end of one error cycle of the method. Usually, the virtual machine will start again after an error, and diagnostic event buffer method 300 will similarly start again.

There are three areas to consider for performance: historical event buffer generation, historical event buffer matching, and cost of tracing. A historical event buffer is generated by collecting method invocation data, machine internal events such as garbage collection cycles, and thread allocations/de-allocations. Historical event buffer matching comes down to matching a sequence of the current event buffer and historical event buffers. This could be implemented in a number of ways, but the cost will be far outweighed by the fact that trace is not being generated when there is not a good match. The cost of tracing is common across embodiments and existing state of the art, however, the embodiments only trace when a buffer matching threshold is reached and so it not on from server start. This has the benefit of starting lightweight, only impacting executions when getting close to the problem area, and producing better quality diagnostic information.

Typical code coverage is done by instrumenting the code at build time. The embodiments, by using virtual machine internals, can get the code coverage without associated overhead of code execution, such as object allocation, and without any requirements to have the code instrumented prior to running in the server.

Figure 4:
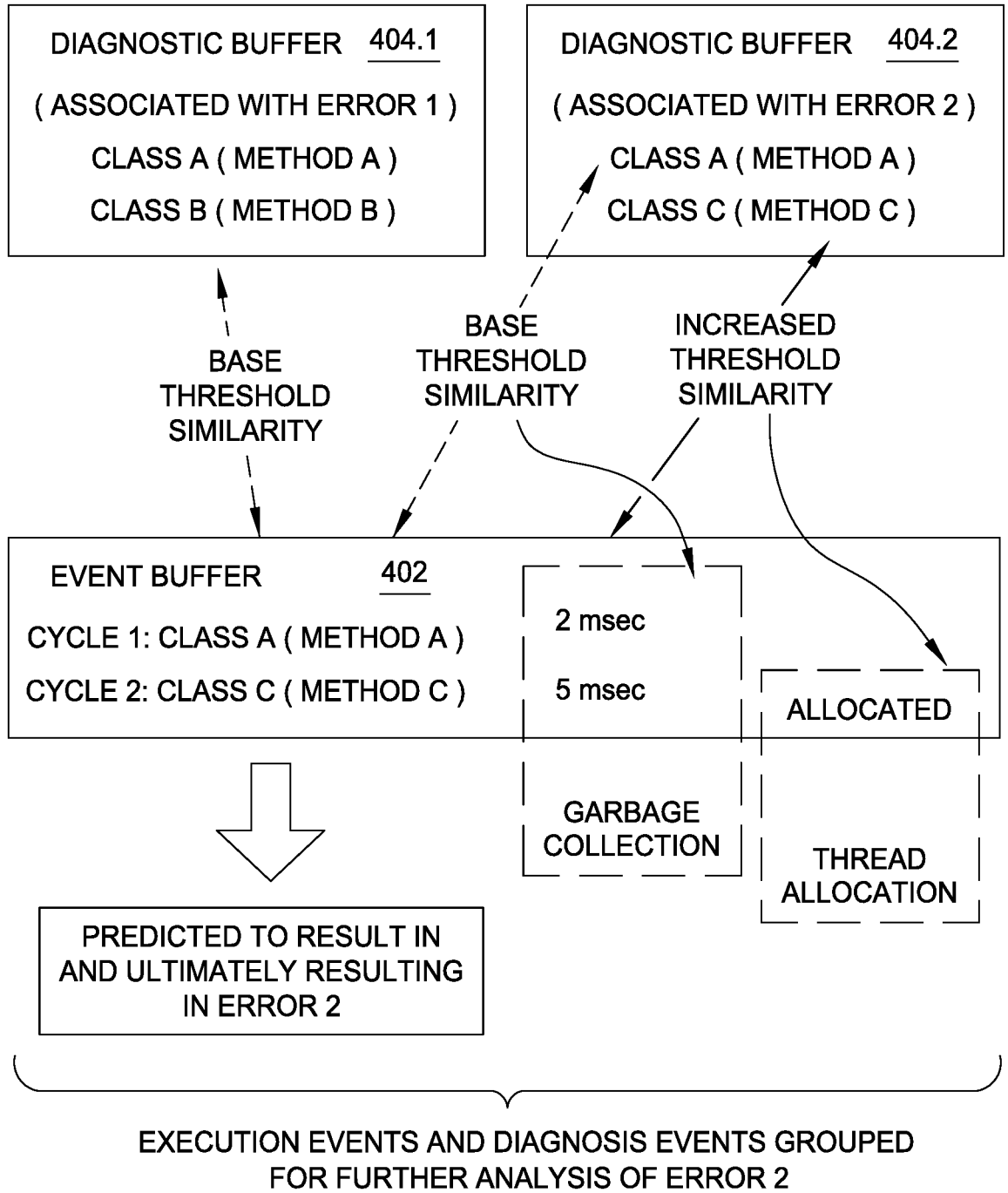
FIG. 4 is one embodiment of an event buffer.

Referring to FIG. 4, an example event buffer 402 is shown and described with diagnostic buffers 404.1 and 404.2. Diagnostic information is information provided from historical buffers that match the current execution code path. As the code paths are executed, the machine will be able to compare this to diagnostic buffers that have been loaded. As the code continues to execute, the machine will be able to better match the diagnostics buffers.

Event buffer 402 is loaded in cycle 1 (step 304) with program elements comprising: class A (method A). In cycle 2, event buffer 402 is loaded with (step 304 again) class C (method C). Event buffer 402 is compared with diagnostic buffers 404.1 and 404.2 (step 308) in both cycles 1 and 2.

Diagnostic Buffer 404.1 is loaded (step 306) with: class A (method A); and class B (method B) associated with error 1. Diagnostic Buffer 404.2 is loaded (step 306) with class A (method A); and class C (method C) associated with error 2.

After cycle 1, event buffer program element class A (method A) partially matches both historical event buffers 404.1 and 404.2 with some similarity. This passes a defined threshold and diagnostic information is requested (step 310) and in this example the similarity equates to garbage collection timing information being requested and record as 2 msec for cycle 1.

After cycle 2 then event buffer 402 additionally comprises class C and method C. Garbage collection timing information is 5 msec for cycle 2.

Now, event buffer 402 is more similar to diagnostic buffer 404.2 after further determination (step 310). The extra level of similarity may result in an extra level diagnostic information being requested (step 310.2), and hence, thread allocation information is requested for cycle 2, and information that a thread has been allocated is received.

At this point (and before a third cycle, not shown), an error occurs that matched the error of diagnostic buffer 404.2 (error 2). All the execution events and diagnostic events are conveniently grouped together now for further analysis of error 2.

Further embodiments of the invention are now described. It will be clear to one of ordinary skill in the art that all or part of the logical process steps of the present embodiment may be alternatively embodied in a logic apparatus, or a plurality of logic apparatus, comprising logic elements arranged to perform the logical process steps of the method and that such logic elements may comprise hardware components, firmware components or a combination thereof.

It will be equally clear to one of skill in the art that all or part of the logic components of the present embodiment may be alternatively embodied in logic apparatus comprising logic elements to perform the steps of the method, and that such logic elements may comprise components such as logic gates in, for example, a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

In a further alternative embodiment, the present invention may be realized in the form of a computer implemented method of deploying a service comprising steps of deploying computer program code operable to, when deployed into a computer infrastructure and executed thereon, cause the computer system to perform all the steps of the method.

It will be appreciated that the method and components of the present embodiment may alternatively be embodied fully or partially in a parallel computing system comprising two or more processors for executing parallel software.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be clear to one skilled in the art that many improvements and modifications can be made to the foregoing exemplary embodiment without departing from the scope of the present invention.

The invention claimed is:

1. A system for providing diagnostic data for execution of a program, the program executable in a machine having a program stack for individual program elements of the program, the system comprising:

a historical event buffer comprising historical execution data associated with at least one runtime error;

an event buffer for saving at least one program element from the program stack as the at least one program element is executed;

a buffer similarity engine for determining a similarity of the event buffer with the historical event buffer; and a diagnostic engine for requesting diagnostic information with the execution of the program in the event buffer when the determined similarity exceeds a threshold.

2. A system according to claim 1, further comprising, an error archiver for, after a runtime error, saving the event buffer as a historical event buffer and associating the historical event buffer with the runtime error.

3. A system according to claim 2, wherein the historical event buffer comprises a portion of the program execution code from a point associated with the runtime error.

4. A system according to claim 3, wherein the system further determines a size of the portion of the program execution in a context of the program execution.

5. A system according to claim 4, wherein the size of the portion is defined in terms of at least one of time, number of entries, or user definition.

6. A system according to claim 1, wherein the diagnostic engine further requests a base level of diagnostic information for a base threshold of similarity and requests an increased level of diagnostic information for an increased threshold of similarity.

7. A system according to claim 1, wherein the diagnostic engine requests a first type of diagnostic information for a first threshold of similarity and requests a second type of diagnostic information for a second threshold of similarity.

8. A system according to claim 1, wherein the diagnostic engine records the diagnostic information and associates the recorded diagnostic information with the at least one program element in the event buffer.

9. A system according to claim 1, wherein the system includes a second historical event buffer associated with at least one second runtime error.

10. A system according to claim 1, wherein an abstracted form of the saved at least one program element is used to reduce an amount of memory used by an event buffer and corresponding historical event buffers.

11. A method for providing diagnostic information for a program execution, the program executable in a machine having a program stack for individual program elements, the method comprising:

saving at least one program element from the program stack into an event buffer as the at least one program element is executed;

loading a historical event buffer associated with at least one runtime error;

determining a similarity between the event buffer and the historical event buffer; and requesting at least one type of diagnostic information be provided with the execution of the program in the event buffer when the determined similarity exceeds a threshold similarity.

12. A method according to claim 11, further comprising, after a runtime error, saving the event buffer as a historical event buffer and associating the historical event buffer with the runtime error.

13. A method according to claim 12, where the historical event buffer comprises a portion of the program execution code from a point associated with the runtime error.

14. A method according to claim 13, further comprising determining a size of the portion of the program execution in a context of the program execution.

15. A method according to claim 14, wherein the size of the portion is defined in terms of at least one of time, or number of entries, or user definition.

16. A method according to claim 11, further comprising requesting a base level of diagnostic information for a base threshold of similarity and requesting an increased level of diagnostic information for an increased threshold of similarity.

17. A method according to claim 11, further comprising requesting a first type of diagnostic information for a first threshold of similarity and requesting a second type of diagnostic information for a second threshold of similarity.

18. A method according to claim 11, further comprising recording the diagnostic information and associating the recorded diagnostic information with the at least one program element in the event buffer.

19. A method according to claim 11, the method further comprising loading a second historical event buffer associated with at least one second runtime error.

20. A computer program product for providing diagnostic information for application execution, the application executable in a machine having a program stack for individual application elements, the computer program product comprising a computer readable storage medium comprising program instructions embodied therewith, the program instructions executable by a processor to perform an operation comprising:

saving at least one program element from the program stack into an event buffer as the at least one program element is executed;

loading a historical event buffer associated with at least one runtime error;

determining a similarity between the event buffer and the historical event buffer; and requesting at least one type of diagnostic information be provided with the execution of the program in the event buffer when the determined similarity exceeds a threshold similarity.

* * * * *